United States Patent [19]
Hagan

[11] Patent Number: 5,147,540
[45] Date of Patent: Sep. 15, 1992

[54] DISPOSABLE COFFEEMAKER FILTER WITH DRAWSTRING

[76] Inventor: John V. Hagan, 7755 S. Sheridan Ct., Littleton, Colo. 80123

[21] Appl. No.: 764,457

[22] Filed: Sep. 24, 1991

[51] Int. Cl.⁵ .......................................... B01D 29/085
[52] U.S. Cl. ................................ 210/232; 210/493.5; 210/497.2; 426/77; 426/81
[58] Field of Search .................... 426/77, 81; 210/232, 210/236, 237, 238, 497.2, 493.5

[56] References Cited

U.S. PATENT DOCUMENTS

| | | | |
|---|---|---|---|
| 1,667,609 | 4/1928 | Tamassy | 426/81 |
| 2,187,417 | 1/1940 | Doble | 426/81 |
| 2,460,735 | 2/1949 | Carroll | 426/81 |
| 3,415,656 | 12/1968 | Lundgren | 426/81 |
| 3,616,934 | 11/1971 | Ehrlich | 210/471 |
| 3,780,871 | 12/1973 | Hicks et al. | 210/471 |
| 3,833,125 | 9/1974 | Schwartz | 210/477 |
| 4,545,833 | 10/1985 | Tafara | 156/93 |

Primary Examiner—Robert A. Dawson
Assistant Examiner—W. L. Millard
Attorney, Agent, or Firm—John R. Flanagan

[57] ABSTRACT

A disposable coffeemaker filter includes a flexible porous disposable filter bag for use in brewing coffee and a drawstring slidably threaded about a top perimeter edge of the filter bag. The drawstring can be pulled to draw the filter bag from an expanded open condition for brewing coffee to a collapsed closed condition for containing the wet used coffee grounds. The drawstring thereby enables the removal and disposal of the filter bag from the basket of a coffeemaker without spilling the coffee grounds from the filter bag.

6 Claims, 2 Drawing Sheets

DISPOSABLE COFFEEMAKER FILTER WITH DRAWSTRING

BACKGROUND OF THE INVENTION

1. Field of the Invention

The present invention generally relates to filters for coffeemakers and, more particularly, is concerned with a disposable filter with a drawstring for enabling removal and disposal of the filter bag from the basket of the coffeemaker without spilling the moist coffee grounds.

2. Description of the Prior Art

A typical automatic drip coffeemaker has a rear reservoir for containing a desired quantity of cold water, an upper basket for supporting a disposable porous filter bag which holds a desired quantity of coffee grounds, a lower warming plate for supporting a carafe directly below a lower outlet of the upper basket, and a heating chamber and element located below the reservoir and connected in communication with an upper inlet to the upper basket for providing a flow of hot water from the heating chamber into the upper basket. The drip coffeemaker thus operates by dripping hot water, which is near boiling temperature, into the expanded open filter bag where the hot water seeps downward through the bed of coffee grounds mixing with and dissolving portions of the coffee grounds to brew the coffee which then flows from the lower outlet of the upper basket into the carafe.

Once the desired quantity of coffee has been brewed, the heating element of the coffeemaker is turned off and the upper basket is removed to permit removing and disposing of the filter bag. Heretofore, the procedure has been to use one's fingers to grip and gather together the upper peripheral edge of the filter bag, lift the bag from the basket and transfer it into a trash bag.

However, due to the high temperature of the water that has soaked the filter bag and the steam being given off by the hot coffee grounds contained in the moist filter bag, it is easy to react to the hot temperature by loosing one's grip on the hot peripheral edge of the bag during lifting and transferring the bag to the trash receptacle. The unfortunate result is that much of the used wet coffee grounds are typically spilled on the countertop and floor, necessitating a messy cleanup operation. Even if the wet filter bag is successfully transfer to the trash bag, the wet coffee grounds tend to spill from the filter bag when it is dropped into the trash bag, creating an unpleasant condition in the trash bag which usually results in the trash bag being changed more often than necessary.

Consequently, a need exists for an improved way to easily remove a disposable filter bag from the coffeemaker basket which will reduce contact with the hot bag and thereby reduce the likelihood of accidental spilling of the wet coffee grounds.

SUMMARY OF THE INVENTION

The present invention provides an improved disposable coffeemaker filter designed to satisfy the aforementioned needs. The improved disposable filter of the present invention has a drawstring for enabling the convenient removal and disposal of the filter bag from the basket of the coffeemaker without spilling the moist coffee grounds. By pulling on the drawstring while the filter bag still rests in the coffeemaker basket, the filter bag can be drawn and gathered from the expanded open condition for brewing coffee to a collapsed closed condition around the coffee grounds contained in the bag. There is no need to tie off the closed filter bag to maintain it in the closed condition, because the threaded relationship of the drawstring with the top perimeter of the filter bag will keep the gathered top edge of the bag completely closed. The closed filter bag can be dropped in a trash bag trash receptacle without the wet coffee grounds spilling from the bag.

Accordingly, the present invention is directed to a coffeemaker filter which comprises: (a) a flexible porous filter bag for use in brewing coffee; and (b) a drawstring slidably threaded about a top perimeter edge portion of the bag and capable of being pulled from an undrawn state to a drawn state to draw the filter bag from an expanded open to a collapsed closed condition. The drawstring thereby enables lifting of the collapsed disposable filter bag and removal and disposal thereof from the basket of a coffeemaker without spilling the moist coffee grounds from the filter bag.

Two different ways in which the drawstring can be threaded with the top perimeter edge portion of the filter bag are disclosed. In a preferred embodiment, a plurality of holes are defined through the top perimeter edge portion of the filter bag between the exterior and interior sides thereof. The holes are substantially aligned in a row and in spaced apart relationship to one another. The drawstring is threaded through the successive holes such that short spans of the drawstring extend in alternating fashion along the interior and exterior sides of the top perimeter edge portion of the bag. In another embodiment, the top perimeter edge portion of the filter bag is folded back and attached to itself so as to leave a narrow passageway about the open top of the filter bag through which the drawstring is threaded.

In both embodiments, the drawstring is formed as a continuous loop. A portion of the loop extends from a pair of the holes in the preferred embodiment or from the open ends of the passage in the other embodiment. The user can easily insert one's finger through the looped portion to pull on the drawstring and draw closed the open top of the filter bag.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
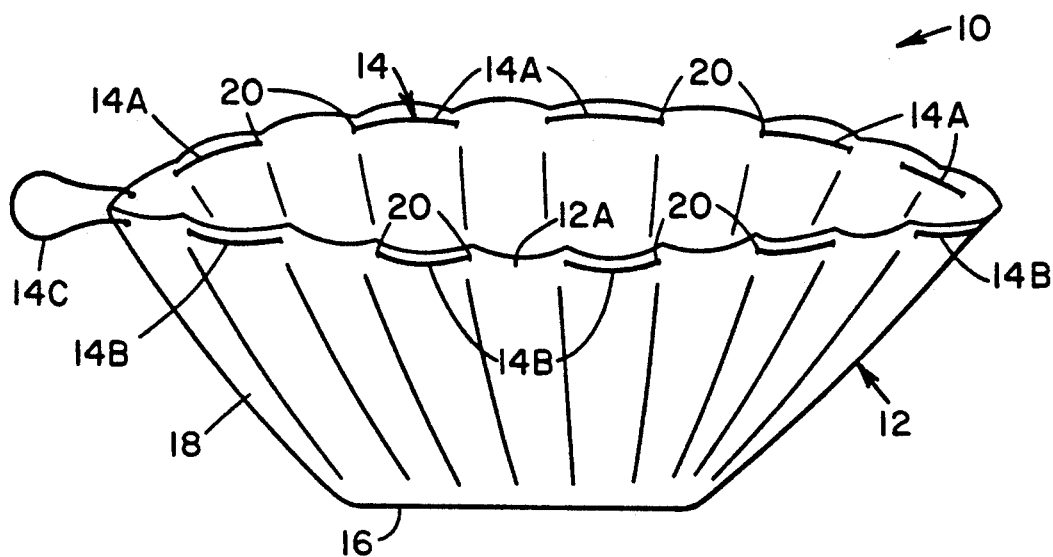
FIG. 1 is a perspective view of an improved disposable coffeemaker filter of the present invention, showing the disposable filter in an expanded open condition with the drawstring in an initial undrawn state.
Figure 2:
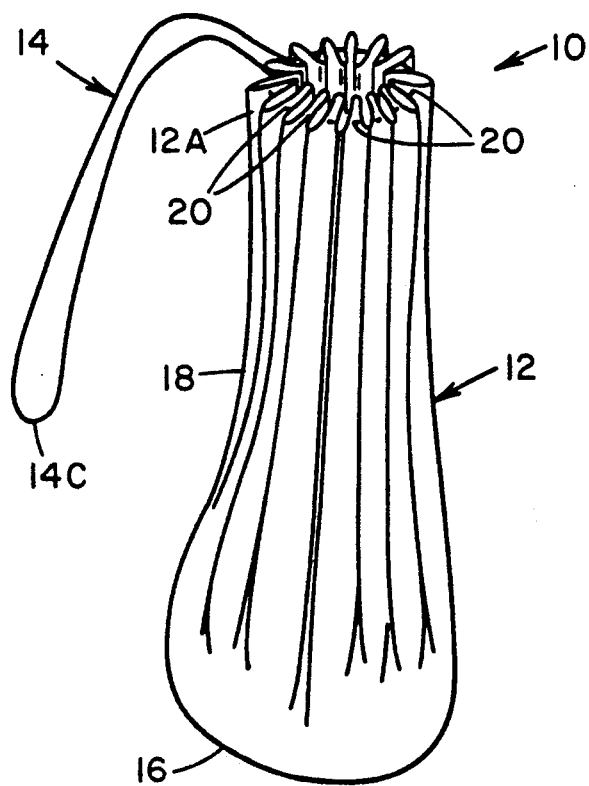
FIG. 2 is a perspective view of the disposable filter showing the filter in a collapsed closed condition with the drawstring in a drawn state.
Figure 3:
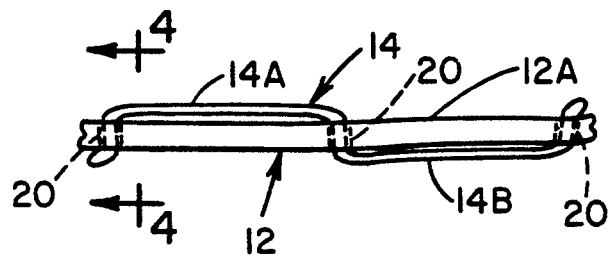
FIG. 3 is an enlarged fragmentary top plan view of the disposable filter.
Figure 4:
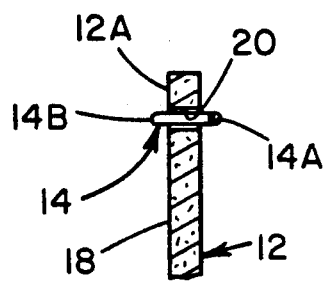
FIG. 4 is a fragmentary sectional view of the disposable filter taken along line 4—4 of FIG. 3.
Figure 5:
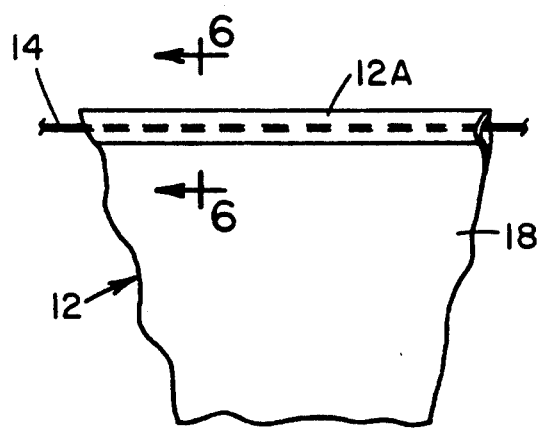
FIG. 5 is a view similar to that of FIG. 3 showing an alternative embodiment of the disposable filter.
Figure 6:
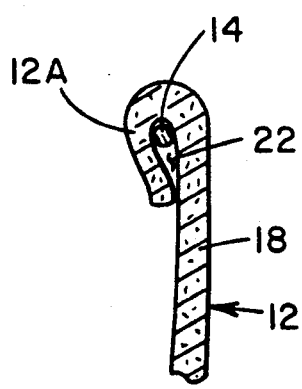
FIG. 6 is a fragmentary sectional view of the disposable filter taken along line 6—6 of FIG. 5.

Referring to the drawings, and particularly to FIGS. 1 and 2, there is illustrated an improved disposable coffeemaker filter, generally designated 10, of the present invention which can be used in, but is not limited to, automatic drip coffee makers. Basically, the disposable filter 10 includes a filter bag 12 and a drawstring 14 threaded about a top perimeter edge portion 12A of the bag 12. The drawstring 14 enables the removal and disposal of the disposable filter 10 from the basket of a coffeemaker (not shown) without spilling the wet used coffee grounds from the bag 12.

The filter bag 12 is identical to any of a number of well-known commercial filter bags used by automatic drip coffeemakers in the brewing of coffee. The filter bag 12 has a bottom wall 16 and a continuous side wall 18 integrally connected to the periphery of the bottom wall 16 and extending upwardly therefrom. The filter bag 12 is made of a suitable flexible porous material which will allow liquids with dissolved solids, but not undissolved solids, to pass through its bottom and side walls 16, 18.

The drawstring 14, which can made of any suitable natural or synthetic material, is slidably threaded about the top perimeter edge portion 12A of the side wall 18 of the filter bag 12. The drawstring 14 is capable of being pulled from an undrawn state, shown in FIG. 1, to a drawn state, shown in FIG. 2, to draw the filter bag 12 from an expanded open condition, shown in FIG. 1, to a collapsed closed condition, shown in FIG. 2. The drawstring 14 thereby enables lifting of the collapsed disposable filter bag 12 and removal and disposal thereof without fear of accidentally spilling the wet coffee grounds from the hot filter bag 12. The frictional contact present between the drawstring 14 and the bag 12 will keep the drawstring 14 in its drawn state and the bag 12 in its collapsed closed condition without the need to tie off the gathered top perimeter edge portion 12A of the bag to keep it closed.

FIGS. 1-6 illustrated examples of two different ways in which the drawstring 14 can be threaded with the top perimeter edge portion 12A of the filter bag 12. In a preferred embodiment shown in FIGS. 1-4, a plurality of holes 20 are defined through the top perimeter edge portion 12A of the filter bag 12 between the exterior and interior sides thereof. The holes 20 are substantially aligned in a row and in spaced apart relationship to one another. The drawstring 14 is threaded through the successive holes 20 such that short spans 14A, 14B of the drawstring 14 extend in alternating fashion along the interior and exterior of the top perimeter edge 12A of the bag 12. In another embodiment shown in FIGS. 5 and 6, the top perimeter edge portion 12A of the filter bag 12 is folded back and attached to itself so as to leave a narrow passageway 22 about the open top of the filter bag 12 through which the drawstring 14 is threaded.

In the case of both embodiments, the drawstring 14 is formed as a continuous loop. A portion of the loop, indicated as 14C in FIG. 1, extends from a pair of the holes 20 in the preferred embodiment of FIGS. 1-4 and, in a fashion comparable to the pair of holes 20, will extend from the open ends of the passage 22 of FIGS. 5 and 6. The user can easily insert one's finger through the exposed looped portion 14C to pull on the drawstring 14 and draw closed the open top of the filter bag 12 as shown in FIG. 2.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. A coffeemaker filter, comprising:
   (a) a flexible porous filter bag for use in brewing coffee; and
   (b) a drawstring threaded about and slidable relative to a top perimeter edge portion of the bag and capable of being pulled from an undrawn state to a drawn state to draw the filter bag from an expanded open condition to a collapsed closed condition for thereby enabling lifting of the collapsed filter bag and removal and disposal thereof from a basket of a coffeemaker without spilling moist coffee grounds from said filter bag;
   (c) said top perimeter edge portion of said filter bag being folded back and attached to itself so as to leave a passageway about an open top of said filter bag through which said drawstring is threaded.

2. The filter of claim 1 wherein said filter bag has a bottom wall and a continuous side wall integrally connected to the periphery of the bottom wall and extending upwardly therefrom, said top perimeter portion defining an open top of said side wall.

3. The filter of claim 1, wherein said drawstring is formed as a continuous loop with a portion of said loop extending from a pair of open ends of said passage to permit insertion of a finger through said loop portion for pulling on said drawstring to draw closed the open top of said filter bag.

4. A coffeemaker filter, comprising:
   (a) a flexible porous filter bag for use in brewing coffee; and
   (b) a drawstring threaded about and slidable relative to a top perimeter edge portion of the bag and capable of being pulled from an undrawn state to a drawn state to draw the filer bag from an expanded open to a collapsed closed condition for thereby enabling lifting of the collapsed filter bag and removal and disposal thereof from a basket of a coffeemaker without spilling moist coffee grounds from said filter bag;
   (c) said drawstring being formed as a continuous loop, a portion of said loop being free to permit insertion of a finger through said loop portion for pulling on said drawstring to draw closed an open top of said filter bag;
   (d) said top perimeter edge portion of said filter bag being folded back and attached to itself so as to leave a passageway about said open top of said filter bag through which said drawstring is threaded.

5. The filter of claim 4 wherein said filter bag has a bottom wall and a continuous side wall integrally connected to a periphery of said bottom wall and extending upwardly therefrom, said top perimeter portion defining said open top of said side wall.

6. The filter of claim 4 wherein said loop portion of said drawstring extends from a pair of open ends of said passage.

* * * * *